United States Patent
Schulte et al.

(10) Patent No.: US 6,834,258 B2
(45) Date of Patent: Dec. 21, 2004

(54) FIELD TRANSMITTER WITH DIAGNOSTIC SELF-TEST MODE

(75) Inventors: John P. Schulte, Eden Prairie, MN (US); Rongtai Wang, Edina, MN (US)

(73) Assignee: Rosemount, Inc., Eden Prairie, MN (US)

(*) Notice: Subject to any disclaimer, the term of this patent is extended or adjusted under 35 U.S.C. 154(b) by 79 days.

(21) Appl. No.: 10/335,380

(22) Filed: Dec. 31, 2002

(65) Prior Publication Data

US 2004/0128110 A1 Jul. 1, 2004

(51) Int. Cl.[7] .................... G06F 11/30; G06F 15/00
(52) U.S. Cl. ........................................... 702/183
(58) Field of Search ............................... 702/104, 182, 702/183, 185; 714/30, 733

(56) References Cited

U.S. PATENT DOCUMENTS

| | | | |
|---|---|---|---|
| 5,828,567 A | * 10/1998 | Eryurek et al. | 700/79 |
| 5,876,122 A | * 3/1999 | Eryurek | 374/183 |
| 5,956,663 A | * 9/1999 | Eryurek | 702/183 |
| 5,960,375 A | 9/1999 | Warrior et al. | 702/104 |
| 6,006,338 A | 12/1999 | Longsdorf et al. | 713/340 |
| 6,014,612 A | * 1/2000 | Larson et al. | 702/183 |
| 6,017,143 A | * 1/2000 | Eryurek et al. | 700/51 |
| 6,119,047 A | * 9/2000 | Eryurek et al. | 700/28 |
| 6,140,952 A | 10/2000 | Gaboury | 341/143 |
| 6,295,875 B1 | 10/2001 | Frick et al. | 73/718 |
| 6,307,483 B1 | 10/2001 | Westfield et al. | 340/870.11 |
| 6,370,448 B1 | 4/2002 | Eryurek | 700/282 |
| 2002/0019562 A1 | 2/2002 | Schleiss et al. | 702/183 |
| 2003/0025983 A1 | * 2/2003 | Lasalandra et al. | 359/290 |

* cited by examiner

*Primary Examiner*—John Barlow
*Assistant Examiner*—Demetrius Pretlow
(74) *Attorney, Agent, or Firm*—Kinney & Lange, P.A

(57) ABSTRACT

A field transmitter for transmitting signals representative of process variables has both a normal operating mode and a diagnostic self-test mode. The field transmitter has a physical sensor for sensing a process variable and generating a physical sensor signal which is representative of the process variable. A signal processing circuit converts the sensor signal to a measurement which is transmitted to a control room. The field transmitter also has a surrogate sensor for producing a surrogate sensor signal which is independent of the process variable. During the diagnostic self-test mode, the surrogate sensor is connected to the signal processing circuit in place of the physical sensor. If the output of the signal processing circuit does not correspond to an expected value, a diagnostic code is produced.

35 Claims, 5 Drawing Sheets

FIELD TRANSMITTER WITH DIAGNOSTIC SELF-TEST MODE

CROSS-REFERENCE TO RELATED APPLICATION(S)

None.

BACKGROUND OF THE INVENTION

The present invention relates to process control systems. More specifically, the present invention relates to a field transmitter having a normal operating or measurement mode and a diagnostic self-test mode.

A field transmitter is a transducer that responds to a measured process variable with a sensing element and converts the variable to a standardized transmission signal (e.g., an electrical or optical signal) that is a function of the measured variable. The term "process variable" refers to a physical or chemical state of matter or conversion of energy. Examples of process variables include pressure, temperature, flow, conductivity, pH, and other properties.

Field transmitters are typically used to monitor process variables and measurements back to a control room in chemical, petroleum, gas, pharmaceutical, and other fluid processing plants. Often, these field applications are subject to harsh and varying environmental conditions.

All electrical components, including the physical sensors and the signal processing circuitry of field transmitters, have the potential to malfunction or fail. Such a malfunction could result in a faulty measurement being sent by the field transmitter to the control room. In addition, circuit drift can also impair the reliability of the transmitter. Routine testing by a skilled technician can detect problems with a transmitter, but that requires the technician to physically access the transmitter. In facilities having a substantial number of distributed field transmitters, there is a practical limit of how frequently a technician can visit and test each transmitter.

BRIEF SUMMARY OF THE INVENTION

The present invention is a field transmitter for transmitting signals representative of process variables. The field transmitter has a physical sensor for sensing a process variable and generating a physical sensor signal which is representative of the process variable. The field transmitter also has a surrogate sensor for producing a surrogate sensor signal which is independent of the process variable. A signal processing circuit is included which converts either the physical sensor signal or the surrogate sensor signal to a measurement value. The field transmitter has a normal operating mode and a diagnostic self test mode. The physical parameter sensor is connected to the signal processing circuit during the normal operating mode, and the surrogate sensor is connected to the signal processing circuit during the diagnostic mode. If the measured value during the diagnostic mode is not the expected value produced by the surrogate sensor, the transmitter detects and can report a malfunction.

DETAILED DESCRIPTION

Figure 1:
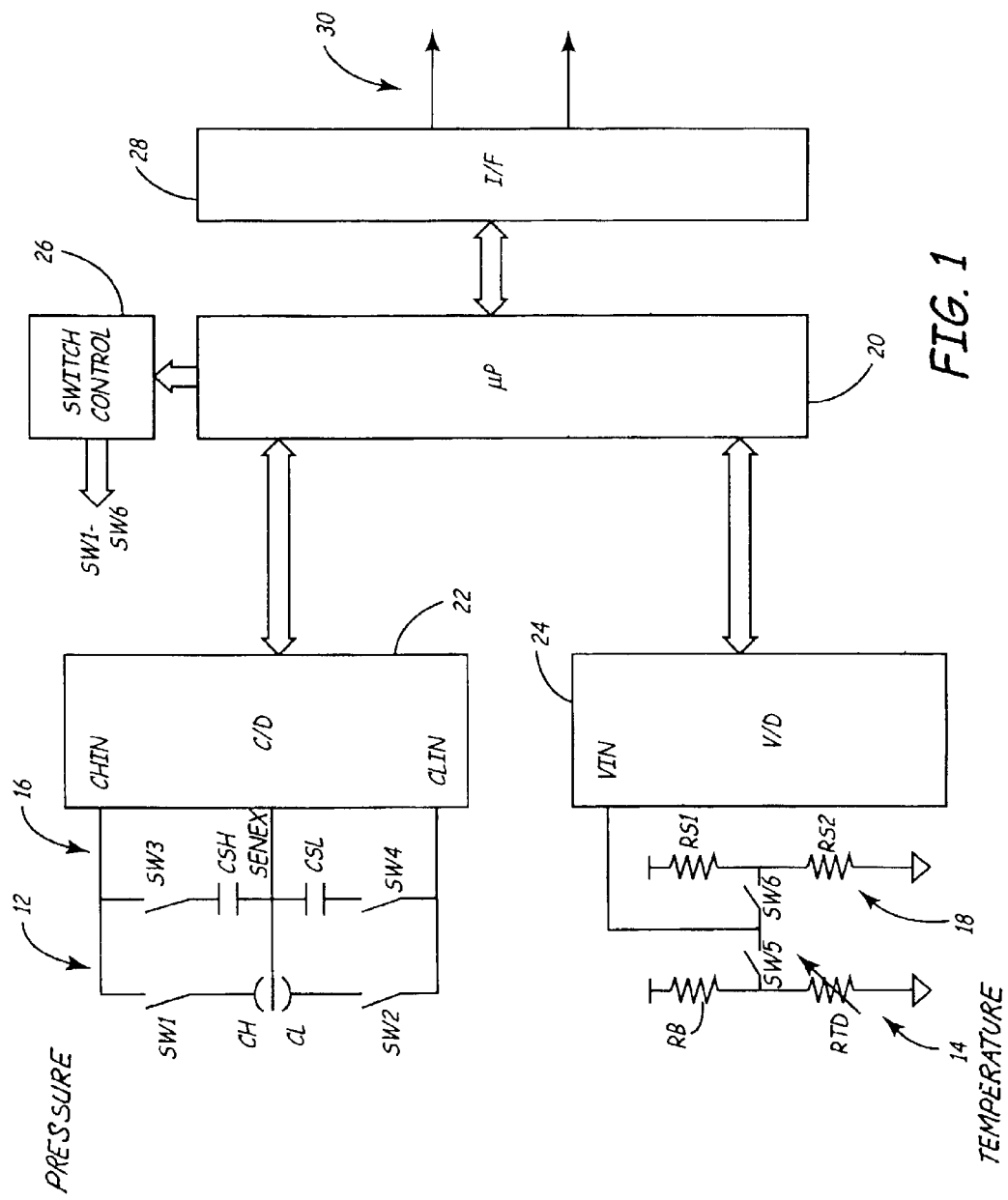
FIG. 1 is a block diagram of a field transmitter including a first embodiment of the diagnostic self-test feature of the present invention.

Field Transmitter 10 (FIG. 1)

FIG. 1 shows field transmitter 10 which features the diagnostic self-test mode of the present invention. Transmitter 10, which in this embodiment is a differential pressure transmitter, includes differential pressure sensor 12, temperature sensor 14, surrogate sensors 16 and 18, microprocessor 20, capacitance-to-digital (C/D) converter 22, voltage-to-digital (V/D) converter 24, switch control 26, and interface 28. Microprocessor 20 is connected to and controls operation of capacitance-to-digital (C/D) converter 22, voltage-to-digital (V/D) converter 24, and switch control 26. Under command by microprocessor 20, switch control 26 controls switches SW1, SW2, SW3, SW4, SW5, and SW6 to select either a normal operating mode or a diagnostic self-test mode. Switches SW1 and SW2 connect pressure sensor 12 to C/D converter 22 during normal operating mode, while switches SW3 and SW4 connect surrogate sensor 16 to C/D converter 22 during diagnostic self-test mode. Switch SW5 connects temperature sensor 14 to V/D converter 24 during normal mode, while switch SW6 connects surrogate sensor 18 to V/D converter 24 during diagnostic mode. C/D converter 22 and V/D converter 24 each typically includes a sigma delta analog-to-digital converter circuit.

Microprocessor 20 receives the digital measurement values produced by C/D converter 22 and V/D converter 24. During normal operating mode, microprocessor 20 uses the digital measurements to produce a temperature-corrected differential pressure signal which is transmitted by interface 28 over communication medium 30. The differential pressure signal may be transmitted as an analog current level, an analog voltage level, or as a digital signal. Microprocessor 20 may also transmit digitally through interface 28 a secondary parameter value (temperature), as well as diagnostic codes.

In normal operating mode, pressure measurement is achieved by selecting switches SW1 and SW2 using switch control 26. This connects main capacitors CH and CL of pressure sensor 12 to C/D converter 22. Pressure sensor 12 includes a deflectable sensing diaphragm and two sensor electrodes which from capacitors CH and CL. The diaphragm is a conductive stretched membrane that deflects in response to pressures applied on opposite sides of the diaphragm. A dielectric fill fluid is used between the capacitor electrodes and the diaphragm. The fill fluid, used with an isolating diaphragm interfacing with the process fluid, prevents the process fluid, which at times can be harsh, corrosive, dirty or contaminated, from interacting with the components of the sensing element and perhaps damaging the components. The capacitance of each capacitor CH and CL changes in proportion to the inverse of the distance between the capacitor plate and diaphragm. Thus, the capacitance of each capacitor CH and CL changes as the diaphragm deflects in response to the applied pressures. Pressure sensor 12 receives a sensor excitation signal SENEX at the diaphragm and supplies analog signals to the CHIN and CLIN inputs of C/D converter 22 which are a function of CH and CL, respectively. C/D converter 22 converts the analog signals to a digital signal which is a function of the difference of CHIN and CLIN analog signals received at the inputs of C/D converter 22. The nominal transfer function is $$\frac{CH - CL}{CH + CL}.$$

Temperature measurement in the normal operating mode is achieved by selecting switch SW5 using switch control 26. This connects the output of temperature sensor 14 to V/D converter 24. Temperature sensor 14 includes bias resistor RB and temperature sensitive resistor RTD. The resistance of temperature sensitive resistor RTD changes as a function of temperature. These changes are detected at the VIN input of V/D converter 24. V/D converter 24 converts input voltage VIN to a digital value which is a function of sensed temperature.

Diagnostic mode operation is achieved by selecting switches SW3, SW4 and SW6 using switch control 26. The diagnostic mode is selected by microprocessor 20 based on a stored schedule or based upon a command received over communication medium 30.

Closure of switches SW3 and SW4 selects surrogate sensor 16, and replaces main sensor capacitors CH and CL with surrogate capacitors CSH and CSL. C/D converter 22 produces its digital output as a function of CSH and CSL, rather then as a function of CH and CL. The output of C/D converter 22 with surrogate sensor 16 connected serves as a basis in determining whether C/D converter 22 is functioning properly. Microprocessor 20 compares the output of C/D converter 22 in the diagnostic mode with a stored expected output (which typically is determined during testing of transmitter 10 during manufacturing). If there is a discrepancy, microprocessor 20 produces a diagnostic code which is transmitted by interface 28 over communication medium 30 to the control room.

Surrogate sensor 16 also can be used to perform half sensor measurements on pressure sensor 12. For example, if microprocessor 20, through switch control 26, selects switches SW1 and SW4, the capacitance magnitude of CH can be determined since the capacitance of capacitor CSL is known. Likewise, if switches SW2 and SW3 are selected, the capacitance magnitude of CL can be determined since the capacitance of capacitor CSH is known. This information can be used to make inferences about static line pressure and module ambient temperature. In certain situations, it may also be useful for detecting oil loss from one of the cell halves. In particular, if one of the cell halves (e.g. CH) is shorted due to conductive process fluid being interposed between one of capacitor electrodes and the diaphragm, and the other cell half (in this example CL) exhibits a normal reading, then oil loss can be inferred.

In the diagnostic mode, switch SW6 connects the output of surrogate sensor 18 to V/D converter 24. Surrogate sensor 18 comprises two resistors RS1 and RS2. The digital output of V/D converter 24 with surrogate sensor 18 connected serves as a basis in determining whether V/D converter 24 is functioning properly. Microprocessor 20 compares the digital output of V/D converter 24 to a stored expected value and produces a diagnostic code if too large a deviation exists.

It is also possible to add more switches and reference resistors to the system (not shown) to simulate zero and a full scale input conditions, which would allow self-test functionality of V/D converter 24 and microprocessor 20 under a variety of input conditions.

Field Transmitter 100 (FIGS. 2–5)

Figure 2:
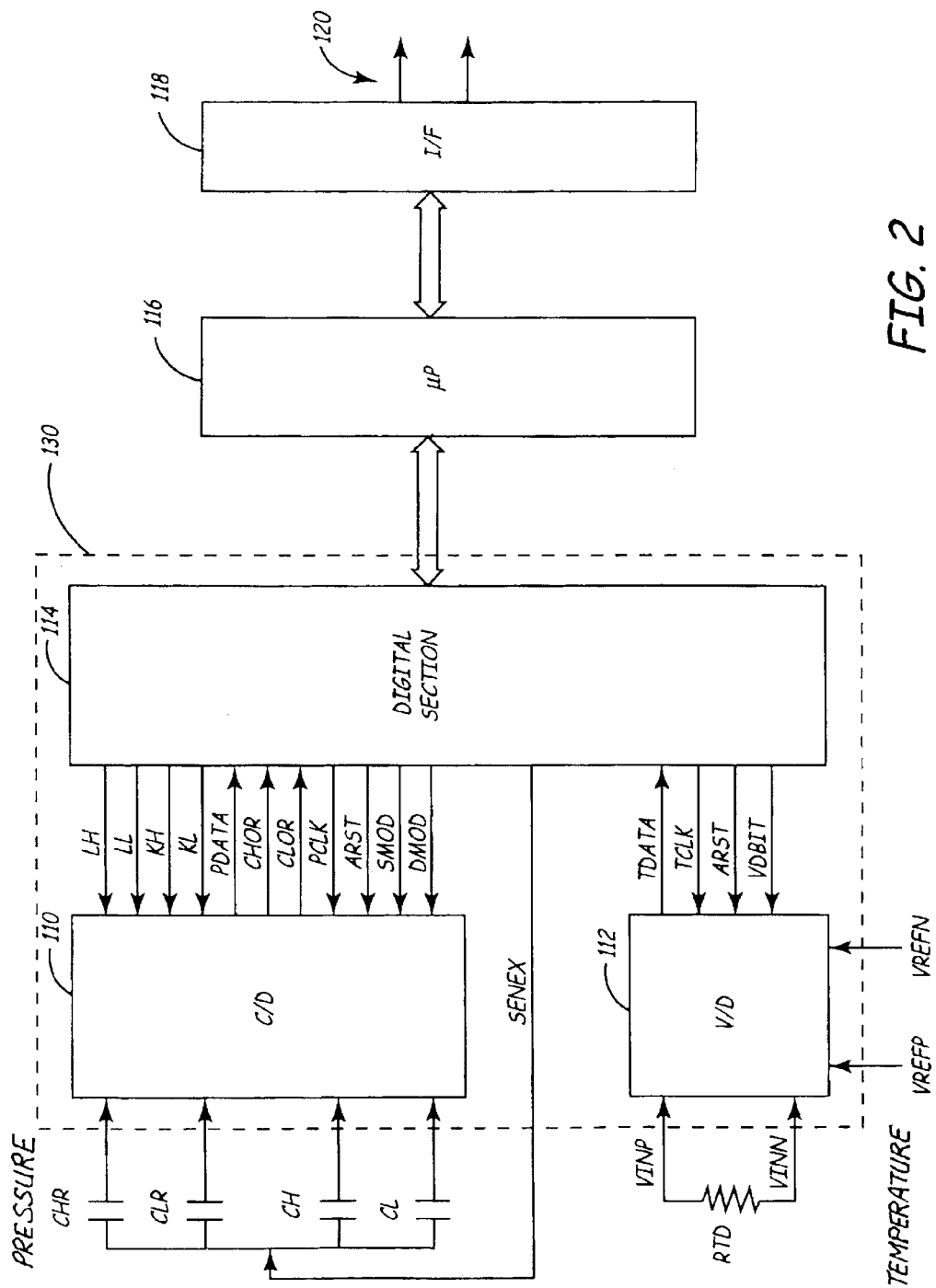
FIG. 2 is a block diagram of a field transmitter including a second embodiment of the diagnostic self-test feature of the present invention.

FIG. 2 shows differential pressure transmitter 100, which includes another embodiment of the diagnostic self-test features of the present invention. Transmitter 100 is a capacitance-based differential pressure transmitter which includes main sensor capacitors CH and CL, ring capacitors CHR and CLR, temperature sensor RTD, capacitance-to-digital (C/D) modulator 110, voltage-to-digital (V/D) modulator 112, digital section 114, microprocessor 116, and interface 118. Communication between transmitter 100 and a control room is provided through interface 118 over communication medium 120. In FIG. 2, communication medium 120 is shown as a two-wire loop over which analog, digital, or a combination of analog and digital communication is provided.

C/D modulator 110, V/D modulator 112 and digital section 114 are incorporated in mixed signal application specific integrated circuit (ASIC) chip 130.

Pressure sensor capacitors CH, CL, CHR, and CLR represent a differential pressure sensor having a conductive center diaphragm, two main capacitor plates, and two ring capacitor plates. Pressure sensors of this type are shown in the Frick et al. U.S. Pat. No. 6,295,875.

Sensor capacitors CH, CL, CHR, and CLR are the analog inputs to C/D modulator 110. A sensor excitation (SENEX) signal is generated by C/D modulator 110 and supplied to the common plate (i.e. the center diaphragm) of sensor capacitors CH, CL, CHR, and CLR. C/D modulator 110 converts the input capacitance ratio of the sensor capacitors to a one-bit data stream PDATA.

C/D modulator 110 also includes an open-ring detector which detects open leads of ring capacitors CHR and CLR. Output signal CHOR from C/D modulator 110 indicates whether the high side ring capacitor CHR is open. Output signal CLOR indicates whether low side ring capacitor CLR is open.

C/D modulator 110 receives a clock signal PCLK and several control signals from digital section 114. Control signals LH and LL select values of programmable linearization capacitors for the high-side and the low side sensors. Control signals KH and KL programmable gain factors for the high and low side ring capacitor inputs, respectively. Control signals SMOD and DMOD select whether C/D modulator 110 operates in its normal operating mode or in a diagnostic self-test mode.

Temperature sensor RTD is a resistance type temperature sensor which presents positive input voltage VINP and negative input voltage VINN to V/D modulator 112. In addition, reference voltages VREFP and VREFN are presented as inputs to V/D modulator 112.

V/D modulator 112 receives a modulator clock signal TCLK and an analog reset signal ARST from digital section 114. In addition, V/D modulator 112 receives a control signal VDBIT which determines whether V/D modulator 112 operates in its normal mode or in a diagnostic self-test mode.

The output of V/D modulator 112 is a one-bit data stream TDATA, which is a pulse code modulated signal representative of an input voltage ratio between an input voltage drop Δ VIN=VINP−VINN (which is the voltage drop across temperature sensor RTD), and a differential reference voltage Δ VREF=VREFP−VREFN.

Digital section 114 provides an interface between the analogs circuitry of C/D modulator 110 and V/D modulator 112 and microprocessor 116. In a preferred embodiment, modulators 110 and 112 and digital section 114 are implemented in an application specific integrated circuit (ASIC) chip 130.

Digital section 114 provides clock and control signals to modulators 110 and 112 and receives the one bit data stream signals PDATA and TDATA from modulators 110 and 112, respectively. Digital section 114 filters the one bit data streams to higher resolution data and stores that data in registers which can be accessed by microprocessor 116.

Digital section 114 also includes configuration registers, which are set by microprocessor 116, and which define the operating parameters for C/D modulator 10 and V/D modulator 112. Included in this configuration data are values which select the operating mode, so that microprocessor 116 can select either a normal operating mode or a diagnostic self-test mode of operation.

Microprocessor 116 interfaces with digital section 114. It sets basic operating parameters, and maps the received data from digital section 114 into pressure and temperature readings.

Microprocessor 116 communicates with a control room through interface 118 and communication medium 120. For example, based upon pressure readings and temperature readings, microprocessor 116 produces an output representing differential pressure which is corrected for temperature. Microprocessor 116 causes interface 118 to vary current flowing through the two-wire loop (communication medium 120) so that the current is representative of the differential pressure output. Microprocessor 116 may also communicate with the control room by a digital communication protocol through interface 118. Using this protocol, microprocessor 116 can send information about a secondary parameter (temperature) as well as diagnostic codes and other-information. Although communication medium 120 is shown as a two-wire loop, sensor readings, diagnostic codes and other data may also be communicated by wireless transmission or over other types of transmission lines.

In a preferred embodiment, modulators 110 and 112 are synchronously operating second-order sigma-delta analog modulators designed for low frequency measurement applications. Each modulator 110 and 112 accepts low level input signals from a transducer and produces a serialized digital output. In the case of C/D modulator 110, the transducer is a capacitance-based metal cell differential pressure sensor formed by CH, CL, CHR and CLR. In the case of V/D modulator 112, the transducer is a resistance type temperature sensor RTD or a non-resistive voltage output temperature sensing device such as diode junction. The modulator outputs PDATA and TDATA are processed by on-chip digital filters contained within digital section 114. These filters are programmable to allow for adjustment of the digital filter notch frequency, cut off frequency and output data rate.

C/D modulator 110 operates over a frequency rate range of about 23 kHz to 66 kHz. C/D modulator 110 accepts four capacitance inputs CH, CL, CHR, CLR from a metal cell differential pressure sensor. Each input signal has a span of 10 pF to 100 pF. C/D modulator 110 produces a ratiometric measurement based on the four capacitors: CH, CL, CHR and CLR. C/D modulator 110 provides the sensor excitation signal SENEX to the common plate of the four capacitators. The SENEX signal switches between two voltage levels VP and VN.

V/D modulator 112 is fully differential and is connected to an RTD type temperature-to-voltage sensor. The excitation of the RTD sensor is generated externally from the ASIC chip 130. V/D modulator 112 operates over a frequency range of 10 kHz to 20 kHz. V/D modulator 112 provides serial PCM data to digital section 114 in the form of the TDATA signal.

Digital section 114 receives the PCM serial data PDATA and TDATA signals from modulators 110 and 112 respectively, and provides filtering using Sinc filtering techniques. The Sinc filters are programmable to allow adjustments for tradeoff of converter resolution and data update rate. Digital section 114 also provides modulator clocks and configuration settings to modulators 110 and 112. The converted C/D and V/D data words are available for microprocessor 116 to read through an SPI serial interface.

The data and configuration registers of digital section 114 can be accessed by microprocessor 116 through the serial communications port that supports the SPI interface. Microprocessor 116 has read/write access to the configuration registers within digital section 114, and has read access to status/interrupt, CD data, and VD data registers.

Microprocessor 116 sets up configuration registers in digital section 114 after a power on reset has occurred. This causes digital section 114 to provide the modulator clocks and configurations settings to modulators 110 and 112 and to begin processing the data signals PDATA and TDATA received from modulators 110 and 112 through its digital filters. When updated data is available, digital section 114 interrupts microprocessor 116, and microprocessor 116 reads the conversion data and clears the interrupt. Microprocessor 116 then waits for the next interrupt to read new conversion data when it becomes available. Digital section 114 only returns valid data; therefore, the first interrupt time is longer than subsequent interrupt times.

Transmitter 100 has several diagnostic features. C/D modulator 110 and V/D modulator 112 have diagnostic self-check features to verity correct operation. In addition, C/D modulator 110 includes circuitry to determine it any of the ring capacitor leads are open and therefore not connected to C/D modulator 110. The configuration registers in digital section 114 are protected with a redundancy scheme that alerts microprocessor 116 if any register bits have been corrupted. The modulator clocks and digital bit streams can be output from a digital test port of digital section 114 to allow advanced diagnostics.

At selected times, microprocessor 116 will set configuration bits within the registers of digital section 114 so that a self test of C/D modulator 110 and V/D modulator 112 will take place.

In the case of C/D modulator 110, the diagnostic self-test mode is selected through the DMOD control signal from digital section 114. When the diagnostic self-test mode is selected, the sensor main capacitors CH and CL are disconnected, and the sensor ring capacitors CHR and CLR are replaced by an on-chip capacitor of a known value (CR=35 pF) which is internal to C/D modulator 110. CR acts as a surrogate sensor input to C/D modulator 110. C/D modulator 110 continues to operate, but with the surrogate capacitor CR being energized by the modulator clock signals. As a result, the PDATA output signal of C/D modulator 110 is a function of the high and low gain factors of $K_H$, and $K_L$, the linear compensation capacitances $C_{Llin}$ and $C_{Hlin}$, and surrogate sensor capacitor CR. The gain factors and the linear compensation capacitance values are selectable based upon configuration information contained in tire registers of digital section 114. This allows the diagnostic self-test mode to test C/D modulator 110 with several different sets of gain factors and linear compensation capacitance values. Thus the digital output of C/D modulator 110 is characterizable independent of the condition of the pressure sensor and independent of the applied pressure. The multiple values of gain and linearization capacitors that can be selected provide the ability to test C/D modulator 110 and digital section 114 at a multiplicity of different known input conditions representing a range of input pressures.

During manufacturing of ASIC chip 130 and manufacturing of transmitter 100, the diagnostic self-test mode is used in a similar way to how it is used during operation in the field. The diagnostic self-test mode is used at the foundry to test ASIC chip 130. Because the test can be performed using only surrogate sensor signals generated on chip, the testing is faster, more accurate, and more reliable. The results of the self-test mode during manufacturing of transmitter 100 are stored by microprocessor 116 so that they can be used for comparison when the diagnostic self-test mode is performed in the field. If the results of the self-test data stored in the registers of digital section 114 during the self-test mode are outside of acceptable limits from the stored values generated during manufacturing testing, microprocessor 116 flags an error. That er-or condition can be communicated as a diagnostic error code through interface 118 and communication medium 120 back to the control room.

During the diagnostic self-test mode, digital section 114 also controls V/D modulator 112 using the VDBIT control signal. In the diagnostic self-test mode, temperature sensor RTD is disconnected from the V/D modulator circuitry using switches within V/D modulator 112. The differential input voltage Δ VIN from the sensor is set to a known value, such as zero (0) volts, which represents a surrogate sensor signal for use in the self-test. Even though modulator 112 produces a null output for a zero input condition, it is being tested by the surrogate sensor signal (ΔVIN=0) because of its sigma-delta charge balancing architecture. In order for it to produce a null output, it must integrate and balance electrical charge which is similar in quantity to the amount of charge integrated in balance for a non-zero input condition. Failure of any of the functional blocks of V/D modulator 112 will prevent it from measuring a zero input condition.

Other known input voltage values can also be provided as surrogate sensor signals to V/D modulator 112 during the diagnostic self-test mode to provide multiple test levels, in a manner similar to the operation of C/D modulator 110 during self-test. If the values returned by digital section 114 to microprocessor 116 indicate a malfunction of V/D modulator 112 during self-test mode, microprocessor 116 communicates the failed test as a diagnostic code through interface 118 and communication medium 120.

The diagnostic self-test mode can be performed periodically under a schedule maintained by microprocessor 116. In addition, the self test could be initiated by the control room sending an appropriate signal over communication medium 120 which is received by interface 118 and provided to microprocessor 116. In either case, transmitter 100 performs testing on its critical components without the need for service personnel to physically access transmitter 100. This allows periodic testing on a more frequent basis than would otherwise be practical.

Figure 3:
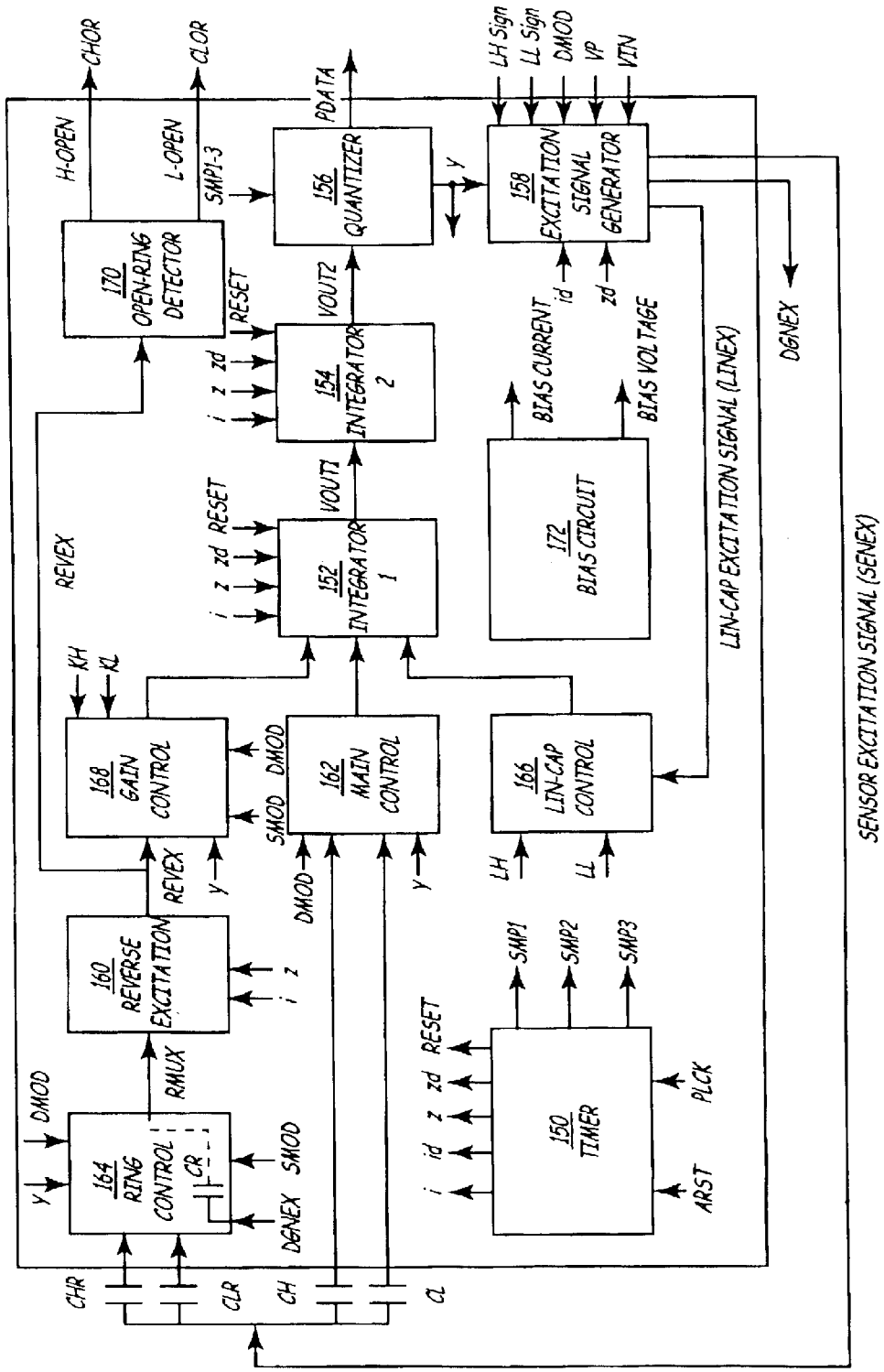
FIG. 3 is a block diagram of the capacitance-to-digital (C/D) modulator of the transmitter of FIG. 2.

FIG. 3 shows a block diagram of C/D modulator 110. As shown in FIG. 3, C/D modulator 110 includes timer 150, first-stage integrator 152, second-stage integrator 154, quantizer 156, excitation signal generator 158, reverse excitation circuit 160, main input control 162, ring input control 164, linear capacitor control 166, gain control 168, open-ring detector 170, and bias circuit 172.

Timer 150 is a timing signal generator which receives the PCLK clock signal and the ARST reset signal from digital section 114, and produces eight timing signals: i, id, z, zd, smp1, smp2, smp3, and Reset.

The i and id signals are an integration phase signal and a delayed integration phase signal, respectively. The z and zd signals are a preparation phase signal and a delayed preparation phase signal, respectively. Signal smp1 is a comparator decision trigger signal; smp2 is a comparator latch signal; and smp3 is a comparator output synchronize signal. Reset is a C/D converter reset signal.

First stage integrator 152 provides an output voltage VOUT1 which is a function of a summation of input capacitances connected to integrator 152 by main input capacitor control 162, linear capacitor control 166, and ring capacitor gain control 168. The input capacitances presented by main control 162 are main capacitors CH and CL, which are driven by the sensor excitation signal SENEX. The linear compensation capacitances presented by linear capacitor control 166 are selected by signals LH and LL, and are driven by linearization capacitor excitation signal LINEX. The capacitances presented by gain control 168 are selected based upon signals KH and KL, and are driven by a reverse excitation signal REVEX, which is a function of ring capacitances CHR and CLR.

The main function of second stage integrator 154 is to perform an operation such that the present value of the output voltage of first stage integrator 152, VOUT1(n), can be integrated with weight of minus ½, while the previous value of the first stage integrator output, VOUT1 (n−1) can be integrated with a weight of plus ¼. The output of second stage integrator 154 is voltage VOUT2, which is supplied to an input of quantizer 156.

The function of quantizer 156 is to convert the analog output of second stage integrator 154, the VOUT2, to a one-bit digital signal. The main components of quantizer 156 are comparator and a flip flop. VOUT2 is compared to a midpoint voltage VMID by the comparator. If the voltage of VOUT2 is lower than VMID, then the comparator output is "1", otherwise it is "0". The D flipflop synchronizes the comparator output signal.

Quantizer 156 has two outputs which are derived from the output of the D flip flop. Quantizer output y is used by excitation signal generator 158 to determine the polarity of the excitation signal. In addition, main control 162, ring control 164, and gain control 168 also make use of logic output y.

Output signal PDATA is the inverse of y. PDATA is a one-bit digital signal which is supplied to digital section 114 as the output of C/D modulator 110.

Excitation signal generator 158 generates three excitation signals, the sensor excitation signal SENEX, a linear compensation capacitor excitation signal, LINEX, and a diagnostic self-test excitation signal DGNEX. Each of these excitation signals switch between two voltage levels: VP and VN. VP is a voltage higher than VMID, and VN is a voltage lower than VMID.

Each of the three excitation signals provided by excitation signal generator 158 can be provided as either positive excitation or negative excitation. A positive excitation signal follows timing signal id. A negative excitation signal follows timing signal zd.

The SENEX signal is generated during the normal operating mode. It is not active during the diagnostic self test mode. If the quantizer logic output y=1, then the next excitation of the SENEX signal must be positive. If the quantizer logic output y=0, then the next excitation of the SENEX signal must be negative.

The LINEX signal is active in both the normal operating mode and the diagnostic self-test mode. The determination of whether the next excitation of the LINEX signal will be positive or negative is a function of the quantizer logic output y and the sign bit of the linearization capacitor codes LH and LL. If the quantizer logic output y=1 and the sign bit of the LH code equals 0, then the next excitation of the LINEX signal must be negative. If the quantizer logic output y=0 and LH sign equals 1, then the next excitation lust be positive. If the quantizer logic output y=0 and the sign bit of the LL code equals 0, then the next excitation must be positive. If the quantizer logic output y=0 and the sign bit LL sign=1 then the next excitation must be negative.

The diagnostic excitation signal DGNEX is active only in the diagnostic self test mode (when DMOD=1). If the quantizer logic output y=1, then the next excitation of DGNEX must be negative. If the quantizer logic output y=0, then the next excitation of DGNEX must be positive.

Reverse excitation signal generator 160 creates a reverse excitation signal REVEX. The excitation polarity of REVEX is opposite to the sensor excitation signal SENEX. The magnitude of REVEX is proportional to the input capacitance presented to the input of reverse excitation signal generator 160 by a ring control 164. The REVEX signal is supplied as an input to both gain control 168 and open-ring detector 170.

Main control 162 serves as the main sensor capacitor input path control. Main control 162 can selectively connect main sensor capacitors CH and CL to an input of first stage integrator 152 based upon the mode selected and the state of the current quantizer logic output y.

During the normal mode, if y=1, then during the next sampling period sensor capacitor CH is connected by main control 162 to the input of first-stage integrator 152. Sensor capacitor CL is disconnected from the input of first-stage integrator 152.

During the normal mode, if y=0, then during the next sampling period sensor capacitor CL is connected by main control 162 to an input of integrator 152. Sensor capacitor CH is disconnected from the input of integrator 152.

If transmitter 100 is in the diagnostic self-test mode (DMOD=I), main control 162 disconnects both CH and CL from integrator 152. In other words, main sensor capacitors CH and CL are not used during the diagnostic self-test mode.

Ring input control 164 serves as the ring capacitor input path control. The inputs to ring input control 164 are ring capacitor CHR and CLR, and the output is signal RMUX which is supplied to the input of reverse excitation generator 160.

Ring input control 164 operates in both the normal operating mode and the diagnostic self test mode. In normal operating mode the sensor excitation signal SENEX is active, and the diagnostic excitation signal DGNEX is inactive. If the current quantizer output y=1, then during the next sampling period, ring capacitor CHR is connected to reverse excitation unit 160 while ring capacitor CLR is disconnected from reverse excitation unit 160. If the current quantizer output y=0, then during the next sampling period ring capacitor CLR is connected to reverse excitation unit 160 while capacitor CHR is disconnected from reverse excitation unit 160.

In the diagnostic self-test mode, the diagnostic excitation signal DGNEX is active and the sensor excitation signal SENEX is inactive. Ring input control 164 disconnects ring capacitors CHR and CLR. In their place, surrogate sensor capacitor CR, driven by DGNEX, is connected by ring input control 164.

Linear compensation capacitor input control 166 includes an array of four linear compensation capacitors having values of 0.5 pF, 1.0 pF, 2.0 pF, and 4.0 pF. The capacitor array has a common plate which is connected to the linearization excitation signal LINEX. The particular capacitor or capacitors connected to first stage integrator 152 are selected by switch logic based upon the current quantizer output signal y and the high and low-side linear capacitor codes LH and LL.

The linear compensation capacitors can also be independently programmed with a five bit digital code which is stored in the analog configuration register. The highest bit of the five bit code is for sign control, and is used by excitation signal generator 158. The lowest four bits set the linearization capacitor value, and are used by linearization capacitor control 166. If the sign bit is 1, the linearization capacitance value is negative. If the sign bit is 0, the linearization capacitance value is positive. In a preferred embodiment, the four bits used to select capacitance values produce sixteen different capacitance values ranging from 0.0 pF to 7.5 pF.

The linear capacitor array is active in both the normal operating mode and in the diagnostic mode. If the current quantizer output y=1, then the high-side linear capacitor code LH is used as the switch control signals to determine which of the linear compensation capacitors will be connected to the input of first integrator 152. If the current quantizer output y=0, then the low-side linear capacitor code LL is used as the switch control signals to determine which linear compensation capacitors will be connected to first stage integrator 152.

Gain control 168 is a programmable input control unit in the form of a programmable capacitor array. In a preferred embodiment, five capacitors having values of 44.75 pF, 1.25 pF, 2.50 pF, 5.0 pF, and 10.0 pF form the programmable gain stage capacitor array. Each of the five capacitors has one plate connected to receive reverse excitation signal REVEX. A switch array selectively connects the opposite plate of each capacitor to the input of first stage integrator 152, according to the high-side gain code KH or the low side gain code KL. If the current quantizer output y=1, then the high-side gain code KH is selected as switch control signals. If the current quantizer output y=0, then the low side gain control KL is selected as the switch control signals. The gain stage capacitor array within gain control 168 is active in both the normal operating mode and the diagnostic mode.

The ring capacitor gain factors KH and KL are independently programmed with a four bit digital code stored in the analog configuration register of digital section 114. With a four bit code, sixteen different pain factors can be selected. In a preferred embodiment, the gain factors vary from 0.39 to 0.54.

Open-ring detector 170 receives the REVEX signal from reverse excitation generator 160. The function of open-ring detector 170 is to detect open leads of ring capacitors CHR and CLR. If one of the leads of the ring capacitors is open, the ring capacitance will reduce to a certain threshhold level. During a high-side sampling, when CHR is selected by ring input control 160, if the voltage of the REVEX signal $V_{REVEX}$ is greater than the threshhold voltage $V_{TH}$ at the end of the integration phase then the high-side ring capacitors CHR is open. This will cause signal CHOR to be set to "1".

During the low-side sampling period CLR is connected by ring input control 164 to reverse excitation generator 162. It $V_{REVEX}$ is less then a low-side threshhold value $V_{TL}$ at the end of the integration phase, than the low-side ring capacitor CLR is open. The signals CLOR is set to "1".

C/D modulator 110 has two operation modes, the normal operation mode and the diagnostic self-test mode. The operation mode is selected by logic signals SMOD and DMOD, which are stored in an analog configuration register of digital section 114. When SMOD-1 and DMOD=0, C/D modulator 110 is operated in the normal operation mode. When SMOD=0 and DMOD=1, C/D modulator 110 is operated in the diagnostic mode. The transfer functions for these two operation modes are specified as follows:

In normal mode, the capacitance ratio under measurement is $$\eta_s = \frac{(C_H - k_H C_{HR} - C_{Hlin}) - (C_L - k_L C_{LR} - C_{Llin})}{(C_H - k_H C_{HR} - C_{Hlin}) + (C_L - k_L C_{LR} - C_{Llin})}$$

where $k_H$ is the high-side ring capacitance gain factor, $k_L$ is the low-side ring capacitance gain factor, and a $C_{llin}$ and $C_{Hlin}$ are the linear compensation capacitance for the high and low side. The transfer function for the C/D modulator operating in normal-mode is specified as $$\frac{(C_H - k_H C_{HR} - C_{Hlin}) - (C_L - k_L C_{LR} - C_{Llin})}{(C_H - k_H C_{HR} - C_{Hlin}) + (C_L - k_L C_{LR} - C_{Llin})} = 2\frac{N_1}{N} \cdot 1$$

where $N_1$ is the digital output of the C/D SINC-filter, $N=2^{24}$. The range of this ratio is $[-1,1]$, the range of $N_1$ is $[0,N]$.

In diagnostic mode, the sensor main capacitors are disconnected and the sensor ring capacitors are replaced by an on-chip capacitor ($C_R$=35 pF). The capacitance ratio under measurement is $$\eta_d = \frac{(k_H C_R - C_{Hlin}) - (k_L C_R - C_{Llin})}{(k_H C_R - C_{Hlin}) + (k_L C_R - C_{Llin})}$$

By choosing different gain factors $k_H$, $k_L$ or linear composition capacitance $C_{Llin}$ and $C_{Hlin}$, different capacitance ratios can be achieved.

The transfer function for the C/D modulator operating in diagnostic self-test mode is specified as $$\frac{(k_H C_R - C_{Hlin}) - (k_L C_R - C_{Llin})}{(k_H C_R - C_{Hlin}) + (k_L C_R - C_{Llin})} = 2\frac{N_1}{N} - 1$$

where $N_1$ is the digital output of the C/D SINC-tilter, $N=2^{24}$. The range of this ratio is $[-1, 1]$; the range of $N_1$ is $[0, N]$.

Figure 4:
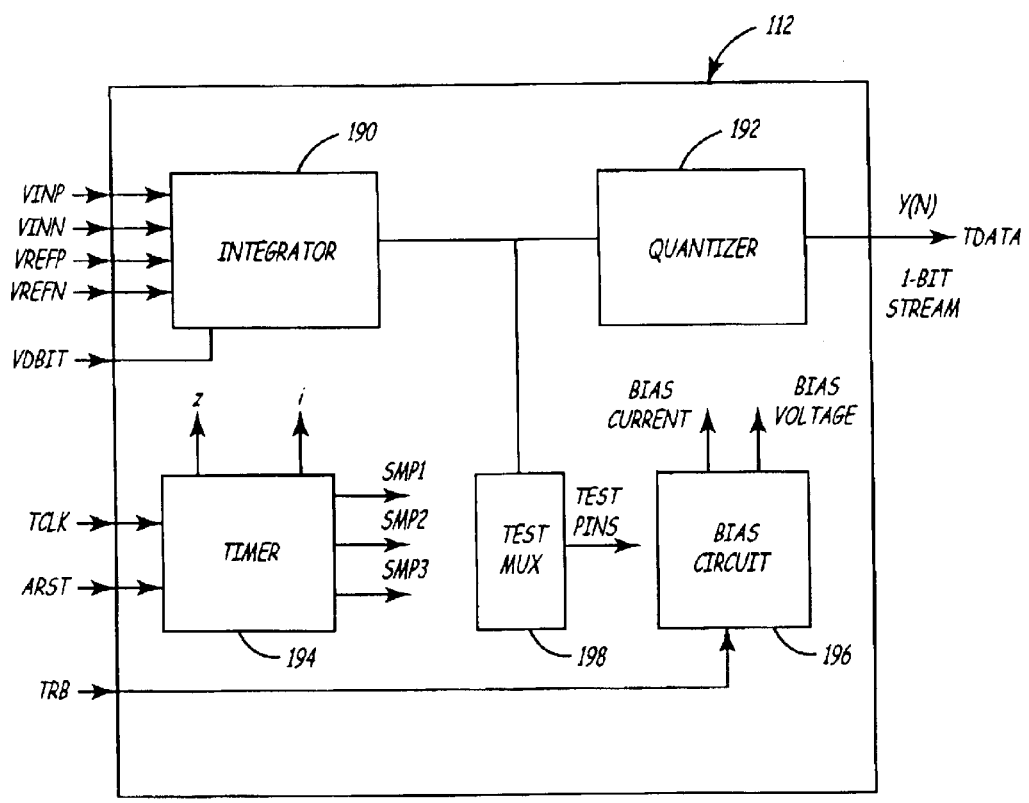
FIG. 4 is a block diagram of the voltage-to-digital (V/D) modulator of the transmitter of FIG. 2.

FIG. 4 shows a block diagram of V/D modulator 112, which includes foul functional blocks: integrator 190, quantizer 192, timer 194, bias circuit 196, and test multiplexer 198.

V/D modulator 112 is a second order sigma delta modulator. Integrator 190 performs a two stage integration based upon input values VINP and VINN and reference values VREFP and VREFN. The output of integrator 190 is provided to quantizer 192. The function of quantizer 192 is to act as a one bit analog-to-digital converter. The output is a pulse code modulated signal TDATA which is a function of the ratio of ΔVIN divided by ΔVREF.

In the diagnostic mode, integrator circuitry 190 shorts the input terminals so that ΔVIN=0, and the digital output will send out data as if the input is zero. If the digital output during the diagnostic self-lest mode is a nonzero value, this indicates a malfunction of V/D modulator 112.

V/D modulator 112 also has a test multiplexer 198 which allows the integrator outputs of the first and second stages of integrator 190 to be sent to analog test pins. This allows on-site diagnostics to be performed by a technician.

Figure 5:
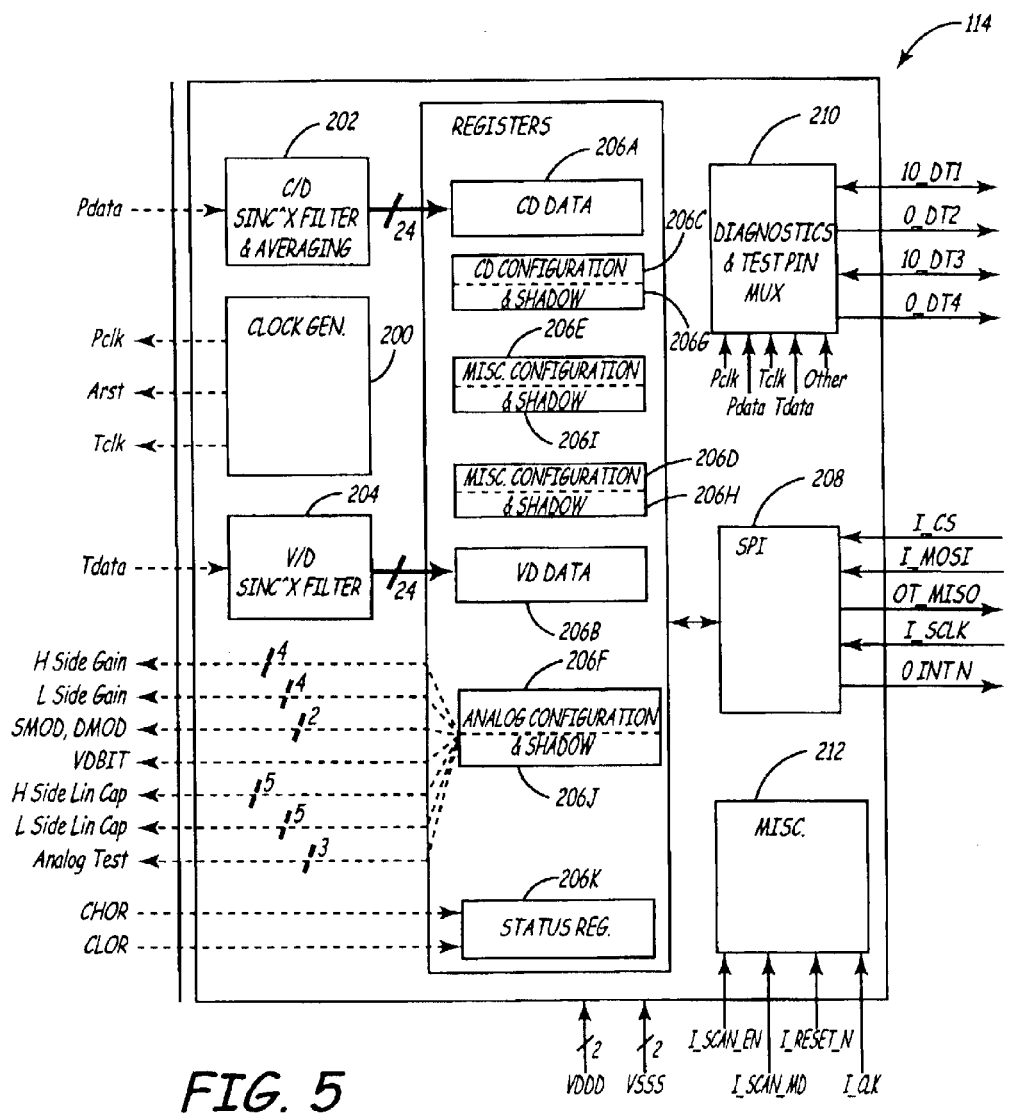
FIG. 5 is a block diagram of the digital section of the transmitter of FIG. 2.

FIG. 5 shows a block diagram of digital section 114. Digital section 114 includes clock generator 200, C/D Sinc^x filter 202, V/D Sinc^2 filter 204, registers 206A–206K, CPI interface 208, diagnostics and test pin multiplexer 210, and miscellaneous chip circuitry 212.

Clock generator 200 derives clock signals used by digital section 114 from a master clock input pin I_CLK. The clock signals are used by digital section 114. Clock signals PCLK and TCLK and reset signal ARST are supplied to modulators 110 and 112 by clock generator 200.

C/D Sinc^x filter 202 is used in conjunction with C/D modulator 110 to measure the capacitance ratio, with the end goal of deriving a high resolution pressure reading. The Sinc^x filter is highly programmable. Sinc filters are used with sigma delta modulators to increase the resolution of the data converter while lowering its output data rate. Filter 202 takes the serial data stream PDATA from C/D modulator 110, filters the data, and stores the 24 bit result in CD Data register 206A.

V/D Sinc^2 filter 204 is used in conjunction with V/D modulator 112 to provide to provide lower resolution voltage measurement. V/D Sinc^2 filler 202 is programmable in decimation rate and scaling. The output of V/D Sync^2 filter 204 is a 24-bit result stored in VD Data register 206B.

Registers 206A–206K are eleven registers that can be accessed by microprocessor 116 through SPI interface 208. The registers include two data registers; CD Data register 206A and VD Data register 206B; four configuration registers CD Configuration register 206C, VD configuration register 206D, Miscellaneous Configuration register 206E and Analog Configuration register 206F; four shadow registers, CD Shadow register 206G, VD Shadow register 206H, Miscellaneous Shadow register 206I, and Analog Shadow register 206J, and Status/Interrupt register 206K.

Microprocessor 116 can read and write to Configuration registers 206C–206F and Shadow registers 206G–206J. It can read only from CD Data register 206A, VD Data register 206B, and status/interrupt register 206K.

CD Data register 206A contains a 24 bit result from the C/D pressure channel. Its value is updated automatically by the Sinc^x filter 202 when a new value is available. If microprocessor 116 is unable to read the new data before the next data is available, a CD_ Overrun status bit will be set is status register 206K. If an update occurs while microprocessor 116 is reading CD Data register, 206A, the new data will be discarded so that the data being read will not be corrupted. CD Data register 206A is constructed so that it will never return all 0's or 1's. If microprocessor 116 reads either of these two values (all 0's or all 1's) from CD Data register 206A, this indicates to microprocessor 116 a problem with serial communications.

VD Data register 206B contains a 24 bit result of the V/D temperature channel. Its value is updated automatically by the V/D Sinc^2 filter 204 when a new value is available. If microprocessor to 116 is unable to read the new data before the next data is available, a VD_Overrun status bit is set in status register 206K. If an update occurs while microprocessor 116 is reading register 206B, the new data will be discarded so that data being read will not be corrupted. Like the CD Data register 206A, VD Data register 206B is constructed so that it will never return all 0's or all 1's. A problem with serial communications is detected by microprocessor 116 if it reads either of these two values from VD Data register 206B.

CD Configuration register 206C controls operation of C/D filter 202. The contents of register 206C include a field which contains the decimation for filter 202, a field that contains the scaling factor for filter 202, a bit that sets the filter order of filter 202 to either a Sinc^3 filter or Sinc^2 filter, and a bit that determines whether filter 202 will automatically average two C/D data values before updating CD Data register 206A, or will not average. Averaging will double the period between updates for the C/D channel.

VD Configuration register 206D controls operation of V/D filter 204. It contains a field which defines the decimation rate for V/D Sinc^2 filter 204 and a field defining a scaling factor for filter 204.

Miscellaneous configuration register 206E contains a field that is used by clock generator 200 to determine the rate of CD modulator clock PCLK, a field which is used by clock generator 200 to determine the duty cycle of clock PCLK, and a field that sets the clock rate for VD modulator clock TCLK. In addition, Miscellaneous configuration register 206E includes bits which determine when interrupts are provided to microprocessor 116 and a bit which enables the digital test pins of multiplexer 210.

Analog Configuration register 206F contains configuration bits for controlling operation of C/D modulator 110 and V/D modulator 112. Register 206F includes fields that set high and low-side ring gains KH and KL and, high and low side linearization capacitor values LH and LL. It also includes bits that define the sign of the high and low side linearization capacitors; bits that determine the state of the SMOD, and DMOD and VDBIT mode select signals supplied to modulator 110 and 112 to select either normal or diagnostic self test mode; and bits which define analog test modes which enable internal analog signals to be made available at test pins. Finally, analog configuration register 206F includes a filter reset field which resets C/D and V/D modulators 110 and 112 and their corresponding filters 202 and 204.

For each Configuration register 206C–206F, there exists a corresponding Shadow register 206G–206J that should contain an inverted copy of the corresponding Configuration register. Microprocessor 116 is responsible for correctly writing data into the Configuration register and its Shadow register. The contents of the Shadow register are continually compared with the contents of the corresponding Configuration register. If at any time a difference is detected, a redundancy error is posted in Status/Interrupt register 206K.

Status Interrupt register 206K contains a chip identification field that identifies the current version of the ASIC chip 130. It also includes a number of status or interrupt bits. These bits indicate when new V/D and C/D data is available, when an overrun of V/D or C/D data has occurred because the register has not been read before it was overwritten with new data, a redundancy error bit which is set it redundancy checks detect a redundancy error, and status bits which indicate whether open-ring detector 170 has detected an open-ring on the high-side or low-side sensors.

Microprocessor 116 communicates with registers 206A–206K through SPI interface 208. When microprocessor 116 initiates a diagnostic self-test, it does so by setting the appropriate bits in Analog Configuration register 206F. The diagnostic self-test mode is then executed in both C/D modulator 110 and V/D modulator 112, and microprocessor 116 reads the results from CD Data register 206A and VD Data register 206B. Microprocessor 116 then compares the results to expected values stored during factory testing. If the results of the diagnostic self-test are outside of acceptable limits, microprocessor 116 flags an error condition and communicates with the control room through interface 118.

While the diagnostic self-test mode is being performed, microprocessor 116 continues to transmit an output over communication medium 120 based upon the normal mode measurements made just before the diagnostic self test. Thus, the diagnostic self-test mode is transparent to the control room—it is performed without presenting the surrogate sensor readings to the control room.

The schedule on which the diagnostic self-test is performed is preferably stored in microprocessor 116. This allows the diagnostic self test to be performed periodically without any need for intervention or instructions from the control room. Microprocessor 116 reports the results of the diagnostic self-test, without need to involve control room circuitry in the self-test procedure.

Alternatively, the diagnostic self-test mode can be initiated from the control room by a control instruction sent to microprocessor 116 over communication medium 120. Also, microprocessor 116 can send the control room the surrogate sensor readings in addition to the evaluation of those readings made by microprocessor 116.

In conclusion, the diagnostic self-test mode of the present invention provides an ability to regularly check the accuracy and performance of a field transmitter without the need for on site testing by a technician. The diagnostic self-test mode can identify the signal processing circuitry (e.g. ASIC chip 130) as the source of an error, so that repair and replacement is facilitated. In addition, the self-test mode is a valuable test at the foundry during manufacture of ASIC chip 130, as well as during manufacture of the field transmitter.

Although the invention has been described in the context of a capacitance differential pressure transmitter, the invention is applicable to any field transmitter. For example, in another embodiment the field transmitter uses a resistive pressure sensor such as a strain gage to produce a voltage which is a function of sensed pressure. The voltage may be converted to digital by a voltage-to-digital sigma delta converter, or by other types of analog-to-digital converter. Surrogate sensor signals are produced in a manner similar to those described with reference to transmitters 10 and 100.

Although the present invention has been described with reference to preferred embodiments, workers skilled in the art will recognize that changes may be made in form and detail without departing from the spirit and scope of the invention.

What is claimed is:

1. A field transmitter for transmitting signals representative of process variables, the field transmitter comprising:
    a physical sensor for sensing a process variable and generating a physical sensor signal which is representative of the process variable;
    a surrogate sensor for producing a surrogate sensor signal which is independent of the process variable;
    a signal processing circuit which converts an input signal to a measurement;
    means for supplying the physical parameter sensor as the input signal to the signal processing circuit during a normal mode and supplying the surrogate sensor as the input signal to the signal processing circuit during a diagnostic mode;
    means for transmitting an output signal over a communication link as a function of the measurement produced during the normal mode; and
    means for performing a diagnostic evaluation based upon the measurement produced during the diagnostic mode.

2. The field transmitter of claim 1, further comprising:
    means for providing an excitation signal to the physical sensor during the normal mode and the surrogate sensor during the diagnostic mode.

3. The field transmitter of claim 1, wherein the physical sensor comprises a capacitive pressure sensor.

4. The field transmitter of claim 3 wherein the surrogate sensor comprises a reference capacitor.

5. The field transmitter of claim 3, wherein the surrogate sensor comprises a plurality of reference capacitors.

6. The field transmitter of claim 1, wherein the physical sensor comprises a temperature sensor.

7. The field transmitter of claim 6, wherein the surrogate sensor comprises a reference voltage source.

8. The field transmitter of claim 7, wherein the surrogate sensor produces a zero voltage input signal.

9. The field transmitter of claim 1 wherein the physical sensor produces a variable capacitance as a function of the process variable.

10. The field transmitter of claim 9, wherein the signal processing circuit comprises a capacitance-to-digital (C/D) converter.

11. The field transmitter of claim 10 wherein the C/D converter includes a sigma delta modulator.

12. The field transmitter of claim 1 wherein the physical sensor produces a variable voltage as a function of the process variable.

13. The field transmitter of claim 12, wherein the signal processing circuit comprises a voltage-to-digital (V/D) converter.

14. The field transmitter of claim 13 wherein the V/D converter includes a sigma delta modulator.

15. The field transmitter of claim 1 and further comprising:
    means for storing an expected value of the measurement during the diagnostic mode.

16. The field transmitter of claim 15 wherein the means for performing a diagnostic evaluation produces a diagnostic code bases on a comparison of the measurement during the diagnostic mode and the expected value.

17. The field transmitter of claim 1 wherein the signal processing circuit and the means for supplying are incorporated in an integrated circuit.

18. The field transmitter of claim 17 wherein the surrogate sensor is incorporated in the integrated circuit.

19. A field transmitter comprising:
    a sensor;
    a signal processor for producing a measurement output as a function of an input from the sensor;
    a communication interface for providing a transmitter output as a function of the measurement output;
    a diagnostic self-test circuit for providing, during a diagnostic mode, a diagnostic input to the signal processor in place of the input from the sensor; and
    means for providing a diagnostic output based upon the measurement output of the signal processor in response to the diagnostic input.

20. The field transmitter of claim 19 wherein the sensor provides a variable capacitance input to the signal processor as a function of a sensed parameter.

21. The field transmitter of claim 20 wherein the diagnostic self-test circuit provides a reference capacitance input to the signal processor during the diagnostic mode.

22. The field transmitter of claim 21 wherein the diagnostic self-test circuit includes a plurality of selectable gain and linearization capacitors.

23. The field transmitter of claim 20 wherein the signal processor is a sigma delta capacitance-to-digital (C/D) modulator.

24. The field transmitter of claim 19 wherein the sensor provides a variable voltage input to the signal processor as a function of a sensed parameter.

25. The field transmitter of claim 24 wherein the diagnostic self-test circuit provides a reference voltage input to the signal processor during the diagnostic mode.

26. The field transmitter of claim 19 wherein the signal processor and the diagnostic self-test circuit are incorporated in an integrated circuit.

27. The field transmitter of claim 26 wherein the diagnostic self-test circuit generates the diagnostic input within the integrated circuit.

28. A field transmitter having a normal operating mode in which a sensor produces a sensor signal which is a function of a sensed parameter, a signal processor converts the sensor signal to a measurement value, and a communication interface transmits a transmitter output as a function of the measurement value, characterized by:
    a diagnostic self-test circuit which substitutes a known surrogate signal for the sensor signal during a diagnostic mode; and
    means for producing a diagnostic output based upon the measurement value produced by the signal processor during the diagnostic mode.

29. The field transmitter of claim 28 wherein the signal processor and the diagnostic self-test circuit are incorporated in an integrated circuit.

30. The field transmitter of claim 29 wherein the diagnostic self-test circuit generates the surrogate signal in the integrated circuit.

31. A field transmitter having a normal mode and a diagnostic self-test mode, the field transmitter comprising:
    a sensor for sensing a parameter and producing a sensor signal;
    a sigma delta modulator for producing a data signal as a function of the sensor signal during the normal mode and as a function of a surrogate signal during the diagnostic self-test mode;
    a data processor for selecting the normal and diagnostic self-test modes, controlling transmission of a transmitter output as a function of the data signal produced during the normal mode, and causing transmission of a diagnostic code is the data signal produced during the diagnostic self-test mode indicates a malfunction.

32. A method of operating a field transmitter to provide a diagnostic self-test, the method comprising:
    initiating a diagnostic self-test mode in which a known surrogate input replaces a sensor input to signal processing circuitry of the field transmitter; and
    comparing an output of the signal processing circuitry with an expected output based upon the known surrogate input.

33. A method of claim 32 and further comprising:
    producing a diagnostic code indicating a result of the diagnostic self-test based upon the comparing of the output of the signal processing circuitry with the expected output.

34. An integrated circuit for use in a field transmitter which produces an output as a function of a parameter sensed by a sensor, the integrated circuit comprising:
    a signal processor for producing a measurement output as a function of an input from the sensor; and
    a diagnostic self-test circuit for providing, during a diagnostic mode, a known diagnostic input to the signal processor in place of the input from the sensor, so that the measurement output of the signal processor during the diagnostic mode is a function of the known diagnostic input.

35. The integrated circuit of claim 34 wherein the diagnostic self-test circuit generates the diagnostic input within the integrated circuit.

* * * * *